United States Patent Office 2,709,126
Patented May 24, 1955

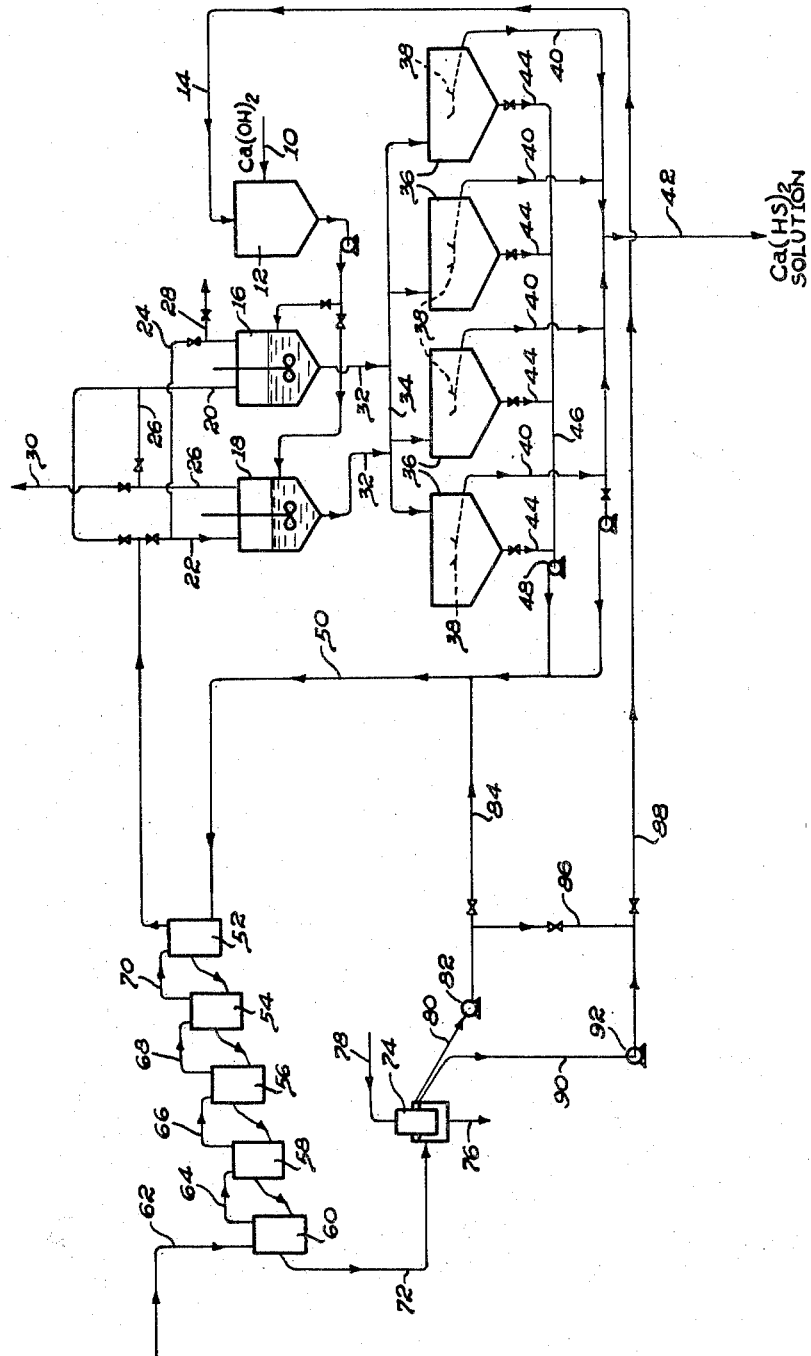

2,709,126

PRODUCTION OF CALCIUM HYDROSULFIDE SOLUTIONS

Herbert A. Gollmar, Mount Lebanon, Pa., assignor to Koppers Company, Inc., a corporation of Delaware Application April 18, 1951, Serial No. 221,599

7 Claims. (Cl. 23—134)

This invention involves the production of calcium hydrosulfide and is particularly concerned with the production of a strong aqueous solution of calcium hydrosulfide suitable for industrial use from an inexpensive grade of lime and a cheap grade of hydrogen sulfide containing a substantial amount of carbon dioxide. A good source of such hydrogen sulfide is the acid gas produced by scrubbing the acid constituents out of gases to be used as fuel, such as coke oven gas, coal and water gas, light gases from catalytic cracking and the like. Hydrogen sulfide is typically the major constituent of such acid gases and carbon dioxide the predominant minor constituent, the latter being generally present to the extent of approximately 20 to 40 volume percent, although acid gas containing a concentration of carbon dioxide of the order of 60 percent can less desirably be used in the present invention.

When aqueous solutions of calcium hydrosulfide are produced from aqueous suspensions of calcium hydroxide (milk of lime) and hydrogen sulfide gas, several problems are encountered.

First, the cheap sources of hydrogen sulfide producer gas, such as the acid gas referred to above, contain a considerable amount of carbon dioxide. When such gases contact aqueous suspensions of calcium hydroxide, a considerable portion of the calcium hydroxide necessarily precipitates as calcium carbonate. The precipitated calcium carbonate shields unreacted calcium hydroxide so that the latter is not efficiently utilized. Also, the original amount of calcium hydroxide necessary to produce a solution of calcium hydrosulfide of even moderate strength is so great that the original suspension is thick and plaster-like while the final product contains so much suspended calcium carbonate and hydroxide that it cannot be handled efficiently.

Second, even if expensive pure hydrogen sulfide is employed, a suspension of calcium hydroxide that will produce a final solution of calcium hydroxide of over 20 percent becomes, during an intermediate stage of absorption, so thick and plaster-like that efficient and rapid absorption of the gas becomes impossible. It is therefore not practical to produce relatively strong solutions of calcium hydrosulfide, such as over about 25 weight percent, by this method.

Third, unless the original lime used in making the suspension of calcium hydroxide is much purer (and consequently more expensive) than the standard commercial grade, a substantial quantity of insoluble material, including a black precipitate, is formed during the reaction. This material is so finely dispersed and gelatinous that the product solution cannot be filtered. Indeed after long standing, only about 5 percent of clear solution could be separated with several poor grades of lime tested, about 60 percent being obtained with a relatively pure lime.

Fourth, unless a relatively strong solution of calcium hydrosulfide is produced, the cost of shipping the solution is sufficiently great that it is not competitive with other materials employed for the same purpose.

In accordance with my invention, I have solved these problems and can economically produce relatively strong solutions of calcium hydrosulfide from impure limes and gaseous mixtures of hydrogen sulfide and carbon dioxide. (As used herein, the term "impure lime" refers to lime that contains a moderate amount of impurities, generally less than 5 percent, precipitatable by hydrogen sulfide and does not refer to the very poor commercial grades of lime containing over 10 percent of precipitatable impurities.) I have discovered that the difficulty of the formation of plaster-like material in the intermediate stage of the absorption of hydrogen sulfide by aqueous suspensions having sufficient calcium hydroxide present to form a strong solution of calcium hydrosulfide can be overcome by maintaining the solution at an elevated temperature such that the reaction mixture remains fluid and capable of rapid absorption of hydrogen sulfide. My investigations show that it is advantageous, in this connection, to maintain the reaction mixture above about 60° C. I prefer to maintain the temperature below the boiling point of the reaction mixture or suspension since the absorption of the hydrogen sulfide is considerably more efficient in the presence of water and prefer to use, in general, higher temperatures for the production of the more concentrated solutions.

Also in accordance with my invention, I utilize as raw material an impure lime in making the suspension of calcium hydroxide. I overcome the disadvantageous effect of precipitated impurities by contacting the suspension with concentrated hydrogen sulfide obtained from a gaseous mixture of carbon dioxide and hydrogen sulfide, as described hereafter, until the calcium hydroxide is substantially completely reacted and then separate the resulting suspension or liquid reaction mixture containing dissolved calcium hydrosulfide and precipitated impurities into a clear strong solution of calcium hydrosulfide and a suspension containing precipitated impurities from the hydrated lime. This suspension contains a substantial amount of calcium hydrosulfide and is usefully employed in scrubbing carbon dioxide of the gaseous mixture of carbon dioxide and hydrogen sulfide used as a source of the latter gas, during which operation the carbon dioxide reacts with the calcium hydrosulfide to yield a precipitate of calcium carbonate and additional quantities of hydrogen sulfide.

In accordance with one aspect of my invention, I maintain the suspension containing the precipitated impurities from the lime within a critical range of temperature of about 50° to 70° C. while it is contacting the gaseous mixture of carbon dioxide and hydrogen sulfide. Under such conditions, the precipitated carbonate and the associated precipitated impurities from the lime are easily filterable and I therefore can obtain a clear solution containing unreacted calcium hydrosulfide. This clear solution of calcium hydrosulfide is returned to the operation, as by employing it in making the suspension of calcium hydroxide, so that the overall process is effected to obtain the maximum utilization of the raw materials. For additional efficiency, I can wash the precipitate from the carbon dioxide scrubbing operation with water after separation of the clear solution of unreacted calcium hydrosulfide and employ this water in making the aqueous suspension of calcium hydroxide.

Various features and details of the invention are described in connection with the accompanying drawing which is a schematic flow sheet illustrating an arrangement of apparatus in which the process of the invention may be carried out.

In the drawing hydrated lime (i. e. unburned limestone hydrated with just sufficient water to produce a dry powder of Ca(OH)₂ preferably containing less than about 5 percent of impurities such as iron oxide and silica, is introduced into a mixing tank 12 to which is added water containing dissolved calcium hydrosulfide through line 14 (the source of this solution is described hereafter). In mixing tank 12, the hydrated lime forms a suspension or slurry of calcium hydroxide or milk of lime containing sufficient calcium hydroxide to form an ultimate solution containing between about 25 to 31 weight percent of calcium hydrosulfide. Although stronger solutions than 32 weight percent of calcium hydrosulfide can be formed in the process of my invention, it is generally desirable not to exceed 31 percent since solutions stronger than this tend to decompose if not maintained under a substantial pressure of hydrogen sulfide and hence are difficult to ship.

The aqueous suspension of calcium hydroxide is pumped from tank 12 to either reaction chamber or zone 16 or 18. The suspensions in these chambers are stirred, as by turbine mixers, at rates such that the suspended calcium hydroxide is rapidly agitated and brought into contact with concentrated hydrogen sulfide, preferably not containing more than 2 to 3 percent of other gases such as carbon dioxide, that is introduced into chambers 16 or 18 by lines 20 or 22. The mixing chambers shown are used alternately for treating batches of material, although continuous apparatus could also be employed. The introduction of hydrogen sulfide into chamber 16 or 18 is continued until absorption of the gas, which continues as long as any appreciable quantity of unreacted calcium hydroxide remains, virtually ceases, thus insuring that substantially all of the calcium hydroxide reacts. Toward the end of a period of treatment in one chamber, the effluent gas may be passed through line 24 or 26 by appropriate valve manipulation into the second chamber, which contains fresh calcium hydroxide, in order to absorb any hydrogen sulfide that may have passed through the first chamber. Exhaust gas, which contains virtually no hydrogen sulfide, is withdrawn from the system by line 28 or 30.

As referred to above, the aqueous suspension of calcium hydroxide must be kept hot (above about 60° C.) during a critical portion of the period of absorption. If this is not done, the partially sulfided solution becomes semi-solid or plaster-like and the absorption of hydrogen sulfide practically stops. The maximum thickening of the suspension occurs when the amount of hydrogen sulfide absorbed is equivalent to that needed to convert about 65 to 75 percent of the calcium hydroxide to calcium hydrosulfide, Ca(HS)₂. The thickening is probably due to the formation of an intermediate compound less soluble than Ca(HS)₂ since the final solution (i. e., at complete conversion of the Ca(OH)₂ to Ca(HS)₂ is very fluid, even at room temperature. As far as I have been able to determine, the intermediate compound is unknown to the prior art; the only compound described in the literature being Ca.SH.OH which is formed at 50 percent conversion. The amount of thickening is proportionate to the amount of the intermediate compound and I therefore prefer to use higher temperatures, such as about 70° or 80° C., when producing high concentrations, such as 30 percent or greater, of calcium hydrosulfide. It is to be noted that the elevated temperature referred to above is not necesasry in the initial half of the absorption or the last stage (from about 85 percent).

In chambers 16 and 18, the impurities in the calcium hydroxide, which are typically iron oxide, aluminum oxide and silica, are precipitated in a gelatinous form. The total precipitate, which is generally black in color, must be separated from the dissolved calcium hydrosulfide in order to produce a saleable clear solution. Accordingly, the reaction mixture or slurry in chambers 16 and 18 is passed by one of the lines 32 to a distributing or manifolding line 34 from which it passes to one of four settling tanks, chambers or zones 36. When concentrated hydrogen sulfide of over 95 percent purity and calcium hydroxide containing a moderate amount of impurities, such as less than 5 percent, are the reactants, the impurities will satisfactorily settle out of the reaction mixture in a period of about 6 to 12 hours. After such settling, the clear supernatant solution of calcium hydrosulfide is withdrawn from the settling tank, as through a skimming device 38, and passed through one of lines 40 to line 42 and thence to a tank car or container or to storage. Yields of at least 50 to 60 percent of clear solution of high grade calcium hydrosulfide are realized when using the better grades of hydrated lime.

A suspension or slurry containing dissolved calcium hydrosulfide and the precipitated impurities from the calcium hydroxide is withdrawn from the bottom settling tank 36 by one of lines 44 and passed through collecting line or manifold 46 to pump 48. Pump 48 forces the slurry through line 50 into the first of a series of reaction or absorption chambers or zones 52, 54, 56, 58 and 60, through which the suspension flows, such as by gravity, in series in a countercurrent direction to the gaseous mixture of hydrogen sulfide and carbon dioxide introduced by line 62 and passing from zone to zone by lines 64, 66, 68 and 70.

This gaseous mixture is preferably a cheap commercial grade of hydrogen sulfide-containing gas, such as the acid gas referred to above, and typically contains from about 40 to 90 volume percent of hydrogen sulfide and about 10 to 60 volume percent of carbon dioxide. Such mixture can be termed an impure or dilute hydrogen sulfide gas. As this mixture passes through absorption chambers 52, 54, 56, 58 and 60, it contacts the slurry introduced by line 50, which is maintained in an agitated state, such as by a turbine mixer. The calcium hydrosufide in the slurry reacts with the carbon dioxide to form gaseous hydrogen sulfide and calcium carbonate, the latter precipitating as a granular material under the conditions employed. The granular calcium carbonate combines or associates with the slime, or gelatinous impurities derived from the impure calcium hydroxide, in such a manner that it acts as a filter aid. Consequently when the slurry is finally withdrawn from the series of absorption chambers by line 72 it can easily be separated into a solid precipitate and a clear solution by filtering it, as for example, in an Oliver continuous rotary filter 74.

The operating conditions maintained in absorption chambers 52, 54, 56, 58 and 60 are quite important in achieving effective results in the overall process. First, the relative ratio at which the slurry and the gas are passed through the absorption chambers should be such that the effluent slurry (in line 72) contains at least a small amount of calcium hydrosulfide (i. e., there is at least a small excess of calcium hydrosulfide in the series of absorption chambers over the amount necessary to react stoichiometrically with the carbon dioxide in the gaseous mixture introduced through line 62). This condition aids in the production of the concentrated or relatively pure hydrogen sulfide needed for the treatment of the slurry of calcium hydroxide. Second, the temperature of the slurry is maintained in the range of about 50° to 70° C., preferably between about 55° to 65° C. This condition results in the precipitation of the calcium carbonate in a granular form that acts as a filter aid. Temperatures above about 70° C. are not desirable because the absorption of carbon dioxide by the slurry is incomplete and the hydrogen sulfide produced contains an excessive amount of carbon dioxide (more than 5 percent) while temperatures below about 50° C. tend to produce an unfilterable precipitate, this tendency increasing as the temperature is lowered.

After filtration of the slurry in filter 74 and removal of a clear solution or filtrate containing calcium hydrosulfide therefrom by line 80, the resulting precipitate is washed by water introduced by line 78 and is removed continuously from the filter by line 76. The filtrate containing calcium hydrosulfide is pumped back into the system by pump 82. Part of the filtrate is sent through line 82 to line 50 through which passes the slurry used for absorption of carbon dioxide and part through lines 86, 88 and 14 to zone 12 where hydrated lime is suspended or slurried, or all of the filtrate may be used for the latter purpose, depending on the needs of the system. In the former operation, the recycled calcium hydrosulfide solution can be advantageously used to increase the rate of liquid flow through zones 52, 54, 56, 58 and 60 and dilute the suspension of calcium carbonate so that the absorption of carbon dioxide is not adversely affected by a thick suspension and so that there is no settling of the precipitate in the absorption zones. The water used in washing the precipitate can also be employed in the preparation of the slurry of calcium hydroxide by sending it through line 90, pump 92 and lines 88 and 14.

From the above description it will be seen that comparatively cheap materials, that is, byproduct hydrogen sulfide gas and industrial lime, may be utilized in making a high grade calcium hydrosulfide. Furthermore, the minimum amount of lime is utilized in removing the carbon dioxide from the gas and this carbon dioxide is important in forming a calcium carbonate which assists in the removal of impurities derived from the impure lime. A careful examination of the process will show that substantially all of the hydrogen sulfide in the gas is converted to calcium hydrosulfide.

This application is a continuation-in-part of my copending application, Serial No. 701,560, filed October 5, 1946, now abandoned.

Obviously many modifications and variations of the invention as hereinbefore set forth may be made without departing from the spirit and scope thereof and therefore only such limitations should be imposed as are indicated in the appended claims.

I claim as my invention:

1. A process for the production of calcium hydrosulfide from impure calcium hydroxide and gaseous mixtures of hydrogen sulfide and carbon dioxide which comprises reacting an aqueous suspension of impure calcium hydroxide containing not over ten percent of precipitatable impurities with hydrogen sulfide until substantially all of the calcium hydroxide is reacted and at such an elevated temperature that the liquid containing the products of reaction is fluid, the amount of calcium hydroxide initially present being sufficient to yield a strong solution of calcium hydrosulfide having a concentration in the range of about 25 to 31 weight percent of calcium hydrosulfide, separating the liquid containing the products of the completed reaction into a clear solution of calcium hydrosulfide of said concentration and a suspension containing dissolved calcium hydrosulfide and precipitated impurities from the calcium hydroxide, producing concentrated hydrogen sulfide by contacting a gaseous mixture of carbon dioxide and hydrogen sulfide with the last named suspension at a temperature in the range of 50° to 70° C., and utilizing concentrated hydrogen sulfide so produced to react with the aqueous suspension of calcium hydroxide as set forth above.

2. The process of claim 1 in which the temperature of the suspension of calcium hydroxide contacted by the hydrogen sulfide is maintained at a temperature in the range of about 60° to 80° C.

3. The process of claim 1 in which the temperature of the suspension of calcium hydroxide contacted by the hydrogen sulfide is maintained above about 60° C. and below the boiling point of the suspension.

4. A process for the production of calcium hydrosulfide from impure calcium hydroxide and gaseous mixtures of hydrogen sulfide and carbon dioxide which comprises reacting an aqueous suspension of impure calcium hydroxide containing not over ten per cent of precipitatable impurities with hydrogen sulfide until substantially all of the calcium hydroxide is reacted, and at such an elevated temperature that the liquid containing the products of reaction is fluid, the amount of calcium hydroxide initially present being sufficient to yield a strong solution of calcium hydrosulfide, separating the liquid containing the products of the completed reaction into a clear strong solution of calcium hydrosulfide and a suspension containing dissolved calcium hydrosulfide and precipitated impurities from the calcium hydroxide, producing concentrated hydrogen sulfide by contacting a gaseous mixture of carbon dioxide and hydrogen sulfide with an excess of the last named suspension, the temperature of said suspension being maintained in the range of about 50° to 70° C., removing from the reaction mixture of said suspension and said gaseous mixture the precipitated calcium carbonate and precipitated impurities from the calcium hydroxide to yield a clear solution containing calcium hydrosulfide, and utilizing concentrated hydrogen sulfide so produced to react with the aqueous suspension of calcium hydroxide as set forth above.

5. The process of claim 4 in which the precipitated calcium carbonate and precipitated impurities from the calcium hydroxide are washed with water and the wash water so produced is employed in making the suspension of calcium hydroxide.

6. A process for the production of calcium hydrosulfide from impure calcium hydroxide and gaseous mixtures of hydrogen sulfide and carbon dioxide which comprises reacting an aqueous suspension of impure calcium hydroxide containing not over ten percent of precipitatable impurities with hydrogen sulfide until substantially all of the calcium hydroxide is reacted and at such an elevated temperature that the liquid containing the products of reaction is fluid, the amount of calcium hydroxide initially present being sufficient to yield a strong solution of calcium hydrosulfide, separating the liquid containing the products of the completed reaction into a clear strong solution of calcium hydrosulfide and a suspension containing dissolved calcium hydrosulfide and precipitated impurities from the calcium hydroxide, producing concentrated hydrogen sulfide by contacting a gaseous mixture of carbon dioxide and hydrogen sulfide with an excess of the last named suspension, the temperature of said suspension being maintained in the range of about 50° to 70° C., removing from the reaction mixture of said suspension and said gaseous mixture the precipitated calcium carbonate and precipitated impurities from the calcium hydroxide to yield a clear solution containing calcium hydrosulfide, using the clear solution of calcium hydrosulfide obtained from said reaction mixture in making the suspension of calcium hydroxide and utilizing concentrated hydrogen sulfide so produced to react with the aqueous suspension of calcium hydroxide as set forth above.

7. A process for the production of calcium hydrosulfide from impure calcium hydroxide and gaseous mixtures of hydrogen sulfide and carbon dioxide which comprises reacting an aqueous suspension of impure calcium hydroxide containing not over ten percent of precipitatable impurities with hydrogen sulfide until substantially all of the calcium hydroxide is reacted and at a temperature in the range of above 60° C. and below the boiling point of the suspension so that the liquid containing the products of reaction is fluid, the amount of calcium hydroxide initially present being sufficient to yield a strong solution of calcium hydrosulfide having a concentration in the range of about 25 to 31 weight percent of calcium hydrosulfide, separating the liquid containing the products of the completed reaction into a clear solution of calcium hydrosulfide of said concentration and a suspension containing dissolved calcium hydrosulfide and precipitated impurities from the calcium hydroxide, producing concentrated hydrogen sulfide by contacting a gaseous mixture containing carbon dioxide and hydrogen sulfide with an excess of the last named suspension, the temperature of said suspension being maintained in the range of about 50° to 70° C., removing from the reaction mixture of said suspension and said gaseous mixture the precipitated calcium carbonate and precipitated impurities from the calcium hydroxide to yield a clear solution containing calcium hydrosulfide, washing the precipitate from the reaction mixture with water, using the clear solution containing calcium hydrosulfide obtained from the reaction mixture and said wash water in making the suspension of calcium hydroxide, and utilizing concentrated hydrogen sulfide so produced to react with the aqueous suspension of calcium hydroxide as set forth above.

References Cited in the file of this patent

UNITED STATES PATENTS

| | | |
|---|---|---|
| 1,793,906 | Christensen | Feb. 24, 1931 |
| 2,317,396 | Murray | Apr. 27, 1943 |
| 2,346,577 | Hartman | Apr. 11, 1944 |
| 2,479,781 | Robinson | Aug. 23, 1949 |

FOREIGN PATENTS

| | | |
|---|---|---|
| 15,648 | Great Britain | Nov. 29, 1890 |

OTHER REFERENCES

J. W. Mellor, "Inorganic and Theoretical Chemistry," vol. 3, 1928, pages 750–751, Longmans, Green and Co., N. Y., Publishers.